United States Patent
Hofmann et al.

(10) Patent No.: US 9,887,624 B2
(45) Date of Patent: Feb. 6, 2018

(54) SYSTEM AND METHOD FOR A SWITCHING CONVERTER

(71) Applicant: Infineon Technologies Austria AG, Villach (AT)

(72) Inventors: Andreas Hofmann, Oberhaching (DE); Roberto Varga, Novi Sad (RS)

(73) Assignee: Infineon Technologies Austria AG, Villach (AT)

( * ) Notice: Subject to any disclaimer, the term of this patent is extended or adjusted under 35 U.S.C. 154(b) by 107 days.

(21) Appl. No.: 14/451,058

(22) Filed: Aug. 4, 2014

(65) Prior Publication Data

US 2016/0036324 A1 Feb. 4, 2016

(51) Int. Cl.
*H02M 3/156* (2006.01)
*H05B 33/08* (2006.01)
*H02M 1/14* (2006.01)

(52) U.S. Cl.
CPC .............. *H02M 3/156* (2013.01); *H02M 1/14* (2013.01); *H05B 33/0815* (2013.01); *H05B 33/0818* (2013.01)

(58) Field of Classification Search
USPC .......... 323/271, 280–285; 315/185 R, 209 R, 315/291, 299
See application file for complete search history.

(56) References Cited

U.S. PATENT DOCUMENTS

| | | | |
|---|---|---|---|
| 2008/0067993 A1* | 3/2008 | Coleman | H02M 1/08 323/282 |
| 2009/0189580 A1* | 7/2009 | Akahane | H02M 3/156 323/282 |
| 2011/0089915 A1* | 4/2011 | Qiu | H02M 3/156 323/271 |
| 2012/0112721 A1* | 5/2012 | Wu | H02M 3/156 323/288 |
| 2014/0078784 A1 | 3/2014 | Nishijima | |
| 2014/0327421 A1* | 11/2014 | Arao | H02M 3/156 323/282 |
| 2014/0354257 A1* | 12/2014 | Paul | H02M 3/156 323/284 |

FOREIGN PATENT DOCUMENTS

| | | |
|---|---|---|
| CN | 1925293 A | 3/2007 |
| CN | 102237811 A | 11/2011 |
| CN | 103023314 A | 4/2013 |

\* cited by examiner

*Primary Examiner* — Timothy J Dole
*Assistant Examiner* — Bryan R Perez
(74) *Attorney, Agent, or Firm* — Slater Matsil, LLP (57) ABSTRACT

According to various embodiments, a method for operating a switching converter includes determining an operating parameter of the switching converter and, if the operating parameter is outside a first operating range, adjusting a control parameter in order to adjust the operating parameter to be within the first operating range. The operating parameter includes at least one of a switching frequency of the switching converter and a current ripple value of an output current.

21 Claims, 9 Drawing Sheets

SYSTEM AND METHOD FOR A SWITCHING CONVERTER

TECHNICAL FIELD

The present invention relates generally to switching circuits, and, in particular embodiments, to a system and method for a switching converter.

BACKGROUND

Power supply systems are pervasive in many electronic applications from computers to automobiles. Generally, voltages within a power supply system are generated by performing a DC-DC, DC-AC, and/or AC-DC conversion by operating a switch loaded with an inductor or transformer. One class of such systems includes switched mode power supplies (SMPS). An SMPS is usually more efficient than other types of power conversion systems because power conversion is performed by controlled charging and discharging of the inductor or transformer and reduces energy lost due to power dissipation across resistive voltage drops.

An SMPS usually includes at least one switch and an inductor or transformer. Some specific topologies include buck converters, boost converters, and flyback converters, among others. A control circuit is commonly used to open and close the switch to charge and discharge the inductor. In some applications, the current supplied to the load and/or the voltage supplied to the load is controlled via a feedback loop.

For example, a buck converter is a specific typology used to step down an input voltage through controlled switching. The inductor is repeatedly charged and discharged such that the voltage supplied to a load is kept at a level below the input voltage. During switching, the controller connected to and supplying the control signals for the switches operates while monitoring various system parameters. Such parameters may be used to calculate feedback control and switching signals. For example, some controllers monitor output voltage or output current and alter switching parameters, such as duty cycle, in order to achieve a specific output voltage or output current.

SUMMARY

According to various embodiments, a method for operating a switching converter includes determining an operating parameter of the switching converter and, if the operating parameter is outside a first operating range, adjusting a control parameter in order to adjust the operating parameter to be within the first operating range. The operating parameter includes at least one of a switching frequency of the switching converter and a current ripple value of an output current.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely switching converters, and more particularly, buck converters. Some of the various embodiments described herein include controllers for switching converters and frequency ripple controllers. In other embodiments, aspects may also be applied to other applications involving any type of switching converter, controller, or switching circuit according to any fashion known in the art.

According to various embodiments described herein, switching converters of various types are operated with various output load voltages. A switching converter may be controlled to maintain a current ripple value for the current output to the load within a current ripple range. The switching converter may also be controlled to maintain the switching frequency of the switches within a frequency range. In various embodiments, a controller monitors current ripple in the output current or switching frequency and adjusts threshold values for switching control signals to maintain the current ripple or switching frequency within a specified operating range. For example, the controller adjusts maximum or minimum current thresholds in order to control the current ripple and the switching frequency. In another example, the controller adjusts an on timer or an off timer to control switching duration and effectively control the current ripple and the switching frequency. In some embodiments, the controller controls a mixture of on time, off time, maximum current, and minimum current.

In various embodiments, some switching converters are highly flexible and adaptable for a broad range of output loads and exhibit improved performance characteristics across the spectrum of output loads. In specific examples, some advantages may include switching converters that maintain reduced losses, reduced electromagnetic interference (EMI), and reduced audible noise while supplying different output load voltages or currents in different usage scenarios without circuit component modification.

In some switching converters, the switching system may be optimized for a specific type of load. This optimization may include specific characteristics for the circuit components including, for example, an inductor, switching transistor, various capacitors, a diode, and other components. A switching converter designed for a specific load may exhibit performance variation if different load voltages are to be supplied by the switching system. Although the controller coupled to the switching converter may effectively modify the switching frequency or duty cycle of the switching signals in order to output the required load current or voltage, the performance of such a system may be affected. For example, the switching frequency may vary to high or low frequencies. In another scenario, the maximum or minimum current ripple may also vary significantly for different load voltages causing increased variation in output current. According to various embodiments described herein, the operation of switching converters is controlled to maintain current ripple and switching frequency with a specified operating range across a broad spectrum of output loads.

Figure 1:
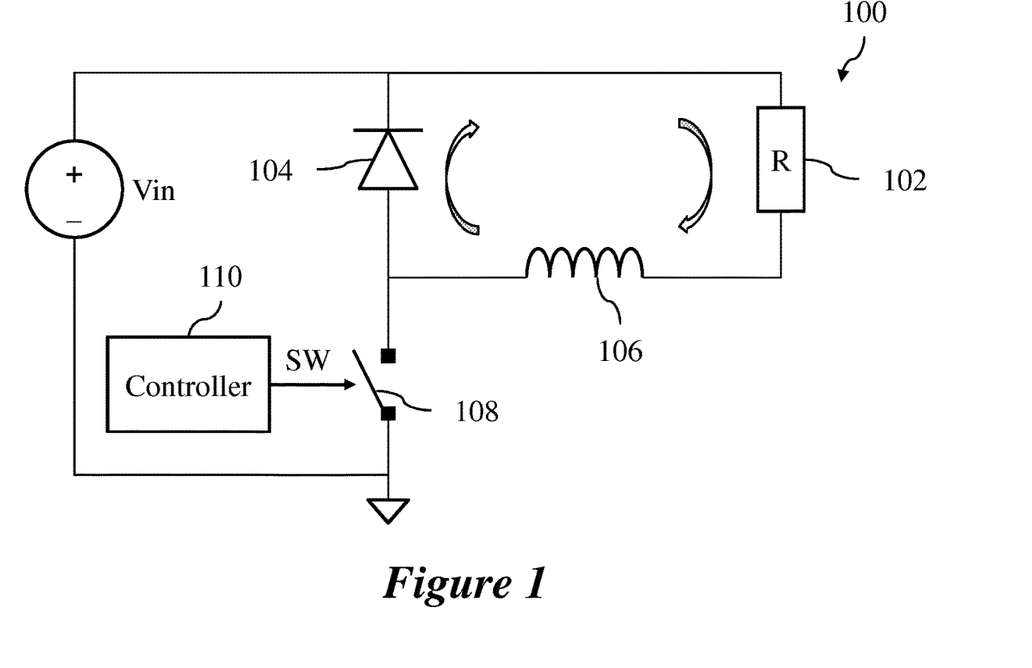
FIG. 1 illustrates a schematic of an embodiment buck converter.

FIG. 1 illustrates a schematic of an embodiment buck converter 100 coupled to load 102 and including diode 104, inductor 106, and switch 108 controlled by switching signal SW from controller 110. According to various embodiments, switch 108 is controlled by controller 110 to open and close periodically in order to charge and discharge inductor 106. In some embodiments, inductor 106 is controlled to maintain a constant average current to load 102. When switch 108 is closed and conductive, input voltage Vin is supplied to load 102, inductor 106, and switch 108 in series. The current flows through these elements in series and charges inductor 106. When switch 108 is opened and non-conductive, current continues to flow through load 102, inductor 106, and diode 104 as shown because of the energy stored in inductor 106. Switch 108 may be repeatedly opened and closed to charge and discharge inductor 106 and supply load 102 with a voltage less than Vin and a constant average current.

According to various embodiments, controller 110 is operated to control switch 108 in order to supply a specific output voltage or output current to load 102 and may include voltage and current measurement components (not shown) for feedback. Controller 110 may be configured to determine the switching frequency and current ripple and to adjust both parameters to maintain the parameters within a specified switching frequency range and current ripple range. Embodiment methods of operation and techniques are described further below in reference to the other figures.

Figure 2:
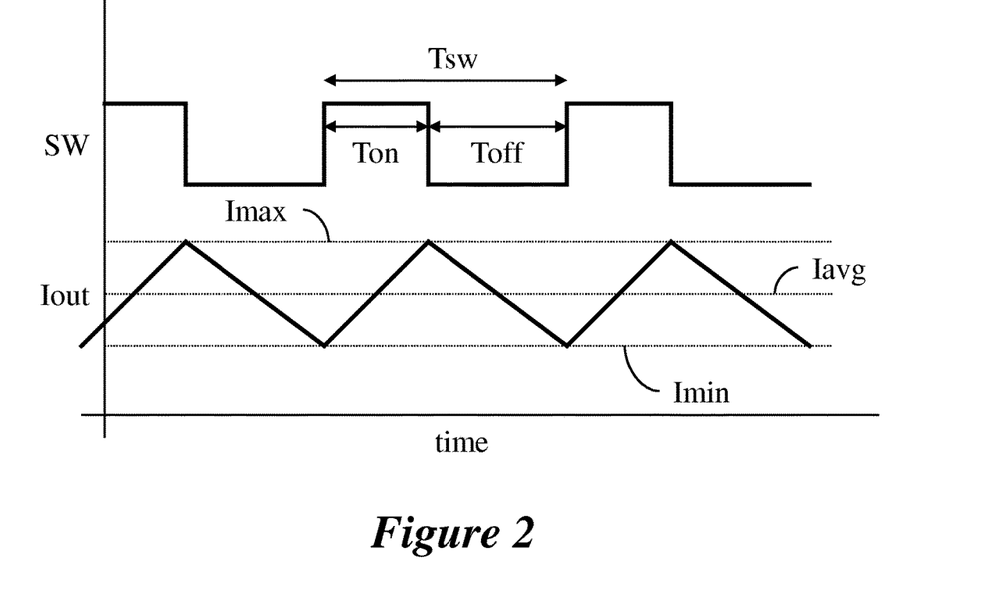
FIG. 2 illustrates a waveform diagram of an embodiment switching converter in operation.

FIG. 2 illustrates a waveform diagram of an embodiment switching converter in operation including switching signal SW and output current Iout. Description of FIG. 2 is applied with reference to buck converter 100 in FIG. 1, but may also be applied to various other switching converters having various typologies. According to various embodiments, when switching signal SW is logic high, corresponding to a closed switch 108, output current Iout increases as inductor 106 is charged by the coupling with voltage supply Vin. When switching signal SW is logic low, corresponding to an open switch 108, output current Iout decreases as inductor 106 is discharged through load 102 and diode 104. In other embodiments, the logic levels of switching signal SW may be reversed or may take any discrete or continuous value.

According to various embodiments, the current ripple of output current Iout may be defined as the difference between the maximum current Imax and the minimum current Imin. Output current Iout may increase linearly between minimum current Imin and maximum current Imax when switching signal SW is active (e.g., logic high) and switch 108 is conducting. When output current Iout increases and decreases linearly, average current Iavg may be the midpoint between maximum and minimum currents Imax and Imin, respectively. In various embodiments, in order to control the current ripple, thresholds controlling maximum current Imax or minimum current Imin may be increased or decreased. If average current Iavg is maintained at a constant value, maximum current Imax and minimum current Imin must be increased or decreased equally in some embodiments. In some embodiments, output current Iout is compared to maximum and minimum current thresholds and the switching on time Ton and switching off time Toff is adjusted to regulate output current ripple and switching frequency. In various embodiments, any of on time Ton, off time Toff, maximum current Imax, and minimum current Imin may be controlled by and compared to threshold values.

According to various embodiments, the switching frequency fsw of switching signal SW is determined by the switching period Tsw of an on cycle and off cycle of switching signal SW. The switching period Tsw is equal to the on time Ton plus the off time Toff, i.e., Tsw=Ton+Toff. The switching frequency fsw is equal to the inverse of the switching period Tsw, i.e., fsw=1÷Tsw. In various embodiments, as the on time Ton or off time Toff is regulated, the switching period Tsw, and consequently the switching frequency fsw, is altered as well. Controller 110 may adjust on time Ton, off time Toff, maximum current Imax, or minimum current Imin in various embodiments.

In various embodiments, the switching frequency fsw is related to current ripple. In some specific embodiments, the switching frequency fsw is inversely related to current ripple Iripple. As the difference between maximum current Imax and minimum current Imin during switching increases, corresponding to increasing current ripple Iripple, more time is required to charge and discharge the energy storage element that conducts the output current Iout, such as an inductor or transformer. This increased charging and discharge time increases the switching period Tsw, thereby decreasing the switching frequency fsw. Conversely, increasing the switching frequency fsw reduces the time available to charge and discharge the output current Iout to maximum and minimum levels, thereby decreasing the current ripple Iripple.

In various embodiments, the switching frequency may affect the losses in the switching converter due to losses proportional to switching frequency that arise from charging and discharging parasitic capacitances. Embodiment systems may include specified current ripple ranges for operation with maximum and minimum thresholds, as switching frequency and current ripple are related in such embodiments. Controller 110 may operate to adjust the current ripple or the switching frequency fsw until the current ripple falls within the specified current ripple range. Similarly, the switching frequency fsw may affect EMI or audible noise production. Some embodiment systems include specified switching frequency fsw ranges for operation with maximum and minimum thresholds. Controller 110 may operate to adjust the current ripple or switching frequency fsw until the switching frequency fsw falls within the specified switching frequency range. A specific embodiment control method is described further below in reference to FIG. 3.

Figure 3:
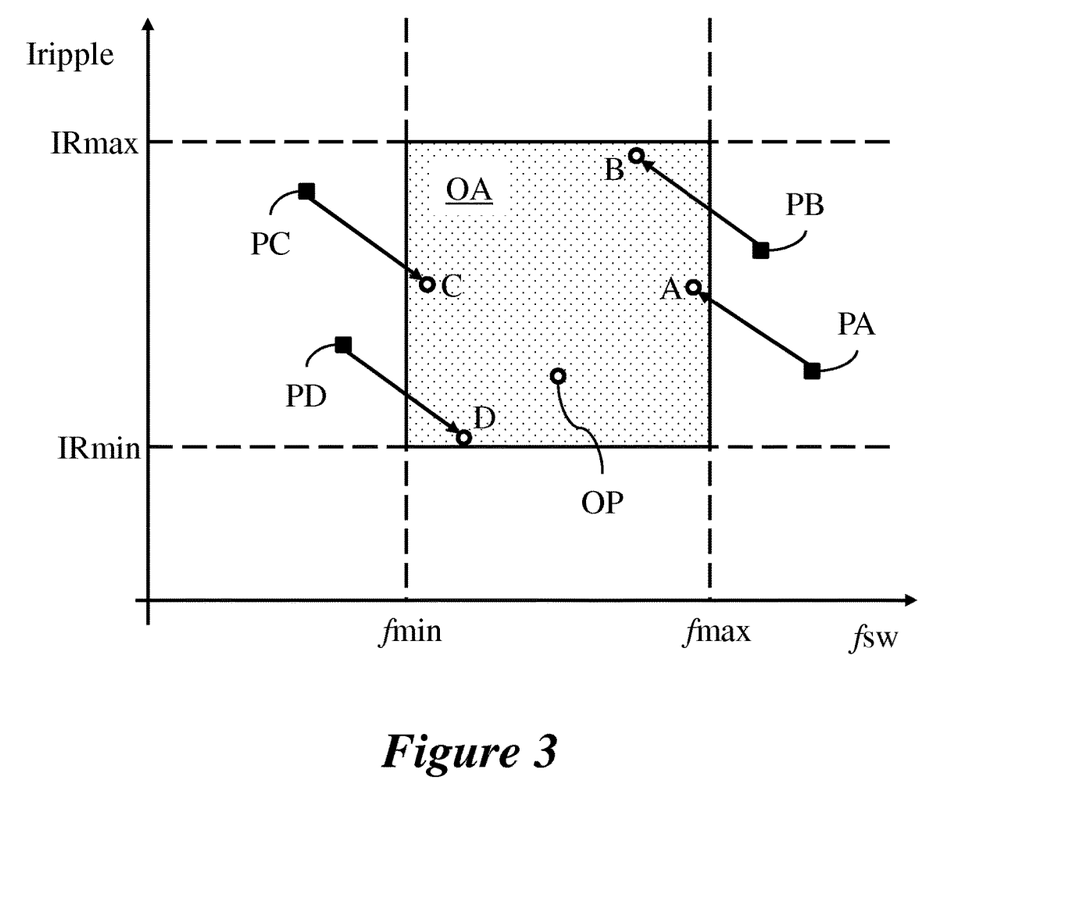
FIG. 3 illustrates a plot of embodiment control variables.

FIG. 3 illustrates a plot of embodiment control variables showing current ripple Iripple on the vertical axis and switching frequency fsw on the horizontal axis. According to various embodiments, both current ripple Iripple and switching frequency fsw include specified operating ranges including maximum and minimum operating thresholds. For example, current ripple Iripple may include maximum ripple threshold IRmax and minimum ripple threshold IRmin while switching frequency fsw may include maximum frequency threshold fmax and minimum frequency threshold fmin.

In various embodiments, a controller operating a switching converter monitors current ripple Iripple and switching frequency fsw and adjusts these values to be within the specified thresholds depicted as operating area OA. FIG. 3 illustrates five initial conditions PA, PB, PC, PD, and OP corresponding to initial current ripple Iripple and switching frequency fsw values for a switching converter. In specific embodiments, a frequency ripple controller (FRC) operates as the switching converter undergoes switching to supply a load. The frequency ripple controller monitors current ripple Iripple and switching frequency fsw and may adjust either value in order to move into the operating area OA shown in FIG. 3. In various embodiments, the frequency ripple controller may adjust current ripple Iripple or switching frequency fsw directly through controlling the switching of the switching converter or indirectly through adjusting a variable capacitor or variable inductor in the switching converter.

For example, initial condition PA includes a current ripple Iripple between maximum and minimum ripple thresholds IRmax and IRmin, respectively. The switching frequency of initial condition PA is outside of maximum and minimum frequency thresholds fmax and fmin, respectively. Thus, the frequency ripple controller increases current ripple Iripple causing switching frequency fsw to move along an inversely related path until reaching operating point A within operating area OA. Within operating area OA current ripple Iripple is between maximum and minimum ripple thresholds IRmax and IRmin and switching frequency fsw is between maximum and minimum frequency thresholds fmax and fmin. Similarly, initial condition PB follows a similar control trajectory as the frequency ripple controller increases current ripple Iripple to move into operating area OA as switching frequency fsw decreases. Thus, corrected operating points A and B are located within operating area OA and correspond to initial conditions PA and PB, respectively, after a frequency ripple controller increases current ripple Iripple.

The frequency ripple controller may decrease current ripple Iripple in order to increase switching frequency fsw above minimum frequency threshold fmin in some embodiments. For example, the switching frequency fsw of initial condition PC is outside of maximum and minimum frequency thresholds fmax and fmin, respectively. Thus, the frequency ripple controller decreases current ripple Iripple causing switching frequency fsw to move along an inversely related path, increasing until reaching operating point C within operating area OA. Similarly, initial condition PD follows a similar control trajectory as the frequency ripple controller decreases current ripple Iripple to move into operating area OA as switching frequency fsw increases. Thus, corrected operating points C and D are located within operating area OA and correspond to initial conditions PC and PD, respectively, after a frequency ripple controller decreases current ripple Iripple. Initial condition OP does not show any adjustments to current ripple Iripple or switching frequency fsw because initial condition OP is within operating area OA.

In various embodiments, maximum ripple threshold IRmax, minimum ripple threshold IRmin, maximum frequency threshold fmax, and minimum frequency threshold fmin may be any value. For example, maximum ripple threshold IRmax may be 30% (as defined as a percentage of average output current Iavg, i.e., Iripple=(Imax−Imin)÷Iavg), minimum ripple threshold IRmin may be 10%, maximum frequency threshold fmax may be 150 kHz, and minimum frequency threshold fmin may be 20 kHz. In another embodiment, maximum ripple threshold IRmax may be 25%, minimum ripple threshold IRmin may be 15%, maximum frequency threshold fmax may be 100 kHz, and minimum frequency threshold fmin may be 50 kHz. In other embodiments, current ripple may be defined as a percentage of maximum current Imax or as another value related to current output variation. In some embodiments, maximum frequency threshold fmax is set to 150 kHz in order to reduce EMI constraints and minimum frequency threshold fmin is set to 20 kHz in order to prevent or reduce audible noise production.

Figure 4:
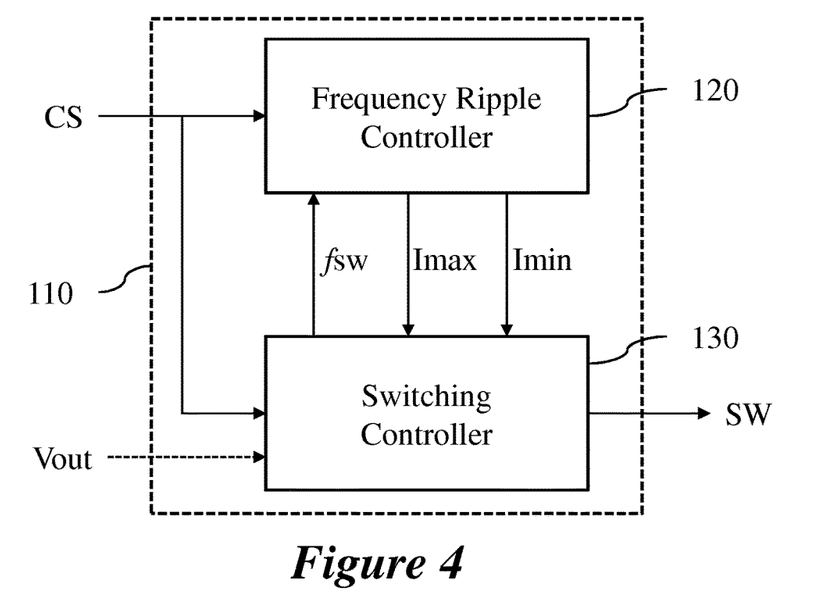
FIG. 4 illustrates a block diagram of an embodiment controller.

FIG. 4 illustrates a block diagram of an embodiment controller 110 as described in reference to FIGS. 1-3. According to various embodiments, controller 110 includes frequency ripple controller (FRC) 120 and switching controller 130. Switching controller 130 generates switching signal SW for switches (not shown) in a switching converter, such as the buck converter illustrated in FIG. 1. In some embodiments, switching signal SW is coupled to a switching driver that drives the switching of switches in the switching converter. In various embodiments, switching controller 130 may receive sensed output current CS and sensed output voltage Vout. Switching controller 130 regulates switching in order to maintain a constant average value for output voltage Vout or a constant average value for output current CS.

In various embodiments, frequency ripple controller 120 receives output current CS and switching frequency fsw and supplies maximum output current Imax and minimum output current Imin to switching controller 130 as thresholds for controlling switching signal SW. Frequency ripple controller 120 may start operation with a specific current ripple Iripple corresponding to specific values for maximum output current Imax and minimum output current Imin. As switching controller 130 supplies switching signal SW to a switch or switches, frequency ripple controller 120 monitors switching frequency fsw and current ripple Iripple and adjust maximum output current Imax and minimum output current Imin thresholds in order to move into an operating point within a defined operating area, as described above in reference to FIG. 3. For example, frequency ripple controller 120 may increase maximum output current Imax and decrease minimum output current Imin, effectively increasing current ripple Iripple, in order to shift switching frequency fsw lower. Similarly, frequency ripple controller 120 may decrease maximum output current Imax and increase minimum output current Imin, effectively decreasing current ripple Iripple, in order to shift switching frequency fsw higher.

In various embodiments, current ripple Iripple is affected by maximum and minimum output currents Imax and Imin. Frequency ripple controller 120 may adjust maximum and minimum output currents Imax and Imin equally in opposite directions in order to adjust current ripple Iripple in some embodiments. In other embodiments, frequency ripple controller 120 adjusts only one of maximum and minimum output currents Imax and Imin and switching controller 130 compensates by adjusting switching signal SW in order to maintain a constant average output current. In such embodiments, only one of maximum and minimum output currents Imax and Imin is controlled or output from frequency ripple controller 120.

According to various operations, if frequency ripple controller 120 adjusts current ripple Iripple outside of the range specified by maximum ripple threshold IRmax and minimum ripple threshold IRmin, as described above in reference to FIG. 3, frequency ripple controller 120 subsequently adjusts current ripple Iripple back into the range specified by maximum ripple threshold IRmax and minimum ripple threshold IRmin. In such embodiments, frequency ripple controller 120 may toggle current ripple Iripple back and forth across one of the ripple thresholds. In other embodiments, frequency ripple controller 120 may stop adjusting current ripple Iripple before exiting the range specified by maximum ripple threshold IRmax and minimum ripple threshold IRmin.

In various embodiments, switching controller 130 includes a timer or multiple timers for setting the timing of switching signal SW. Switching controller 130 may set the timer value or values based on the maximum and minimum output currents Imax and Imin received from frequency ripple controller 120. In various embodiments, output current CS corresponds to a current output from switches to an energy storage element, such as an inductor or transformer. In other embodiments, output current CS corresponds to a current output from the energy storage element to a load. Output current CS may be measured from other positions in the switching converter or load. Controller 110 may be implemented as an integrated circuit (IC), as a microcontroller, as discrete components, or as some combination of such components.

Figure 5:
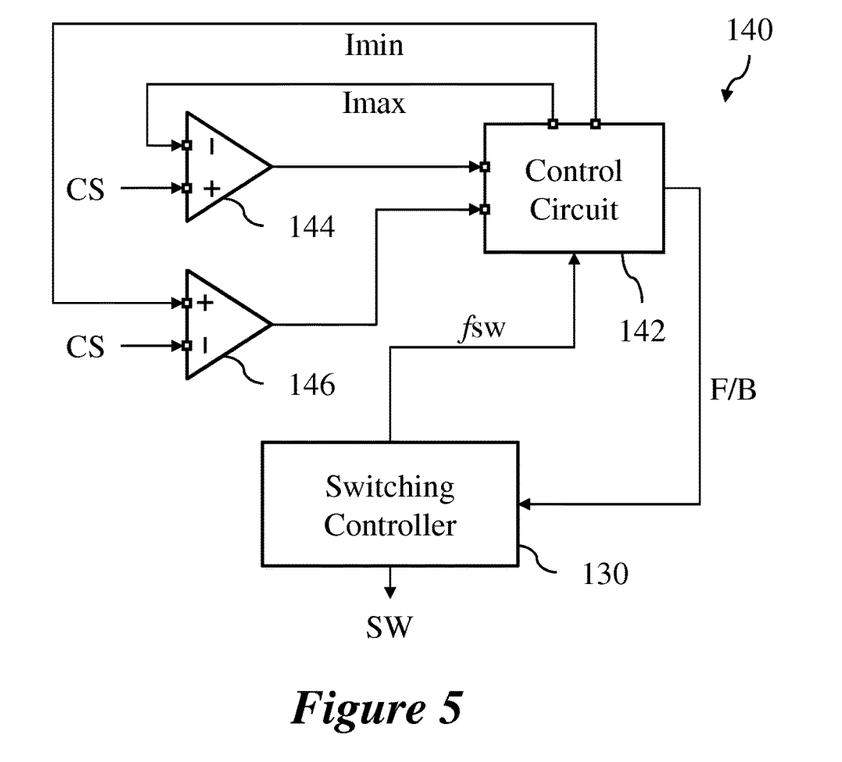
FIG. 5 illustrates a block diagram of another embodiment controller.

FIG. 5 illustrates a block diagram of another embodiment controller 140 including control circuit 142, comparators 144 and 146, and switching controller 130. According to various embodiments, control circuit 142 and comparators 144 and 146 may be another implementation of a frequency ripple controller similar to frequency ripple controller 120 as described in reference to FIG. 4 above. In such embodiments, sensed output current CS is provided to inputs of comparators 144 and 146 and compared to maximum and minimum output currents Imax and Imin, which are set as threshold values by control circuit 142. Based on the comparison, control circuit 142 generates feedback signal F/B and provides feedback signal F/B to switching controller 130, which adjusts switching signal SW based on feedback signal F/B. In various embodiments, feedback signal F/B corresponds to an on time Ton or an off time Toff, a logical switching control signal, or an analog control signal.

In various embodiments, control circuit 142 receives switching frequency fsw from switching controller 130 and adjusts current ripple Iripple by adjusting maximum output current Imax or minimum output current Imin. Current ripple Iripple and switching frequency fsw may be controlled to operate within a specified range for maximum ripple threshold IRmax, minimum ripple threshold IRmin, maximum frequency threshold fmax, and minimum frequency threshold fmin, as described above in reference to the FIGS. 1-4.

According to various embodiments, control circuit 142 may be an analog control circuit. In other embodiments, control circuit 142 may be a digital control circuit including digital logic functions. Controller 140 may be implemented as an integrated circuit (IC), as a microcontroller, as discrete components, or as some combination of such components.

Figure 6:
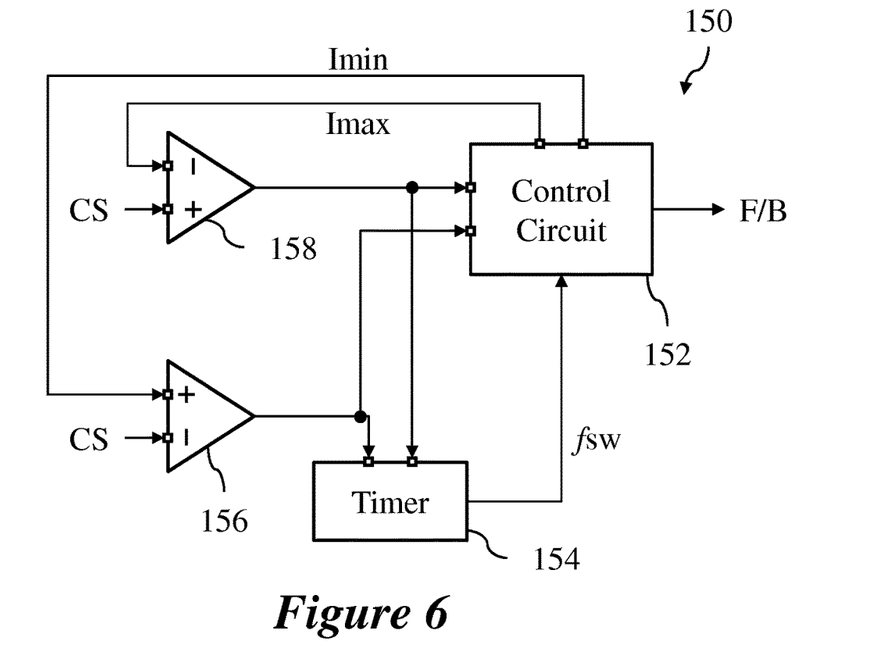
FIG. 6 illustrates a block diagram of a further embodiment controller.

FIG. 6 illustrates a block diagram of a further embodiment controller 150 including control circuit 152, timer 154, and comparators 156 and 158. According to various embodiments, controller 150 may be another implementation of a frequency ripple controller that monitors sensed output current CS and compares sensed output current CS to maximum and minimum output currents Imax and Imin. Timer 154 monitors the outputs of comparators 156 and 158 to determine switching frequency fsw based on timing on time Ton and off time Toff, for example. Control circuit 152 receives switching frequency fsw, regulates current ripple Iripple through maximum and minimum output currents Imax and Imin, and generates feedback signal F/B for a switching controller (not shown). Feedback signal F/B may include frequency information, maximum and minimum output currents Imax and Imin thresholds, or switching signals in various embodiments, as described above in reference to feedback signal F/B from control circuit 142.

According to various embodiments, control circuit 152 may be an analog control circuit. In other embodiments, control circuit 152 may be a digital control circuit including digital logic functions. Controller 150 may be implemented as an integrated circuit (IC), as a microcontroller, as discrete components, or as some combination of such components.

Figure 7:
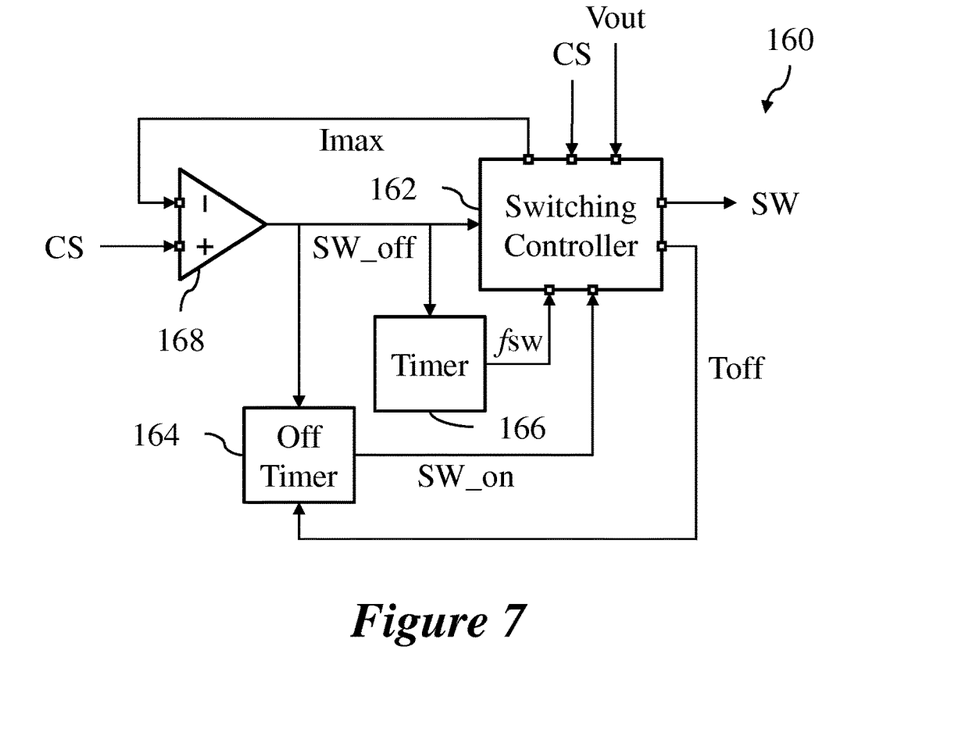
FIG. 7 illustrates a block diagram of a still further embodiment controller.

FIG. 7 illustrates a block diagram of a further embodiment controller 160 including switching controller 162, timer 166, off timer 164, and comparator 168. According to various embodiments, switching controller 162 provides switching signal SW to a single switch or multiple switches within a switching converter based on various control signals and measurements. Switching controller 162 with timer 166, off timer 164, and comparator 168 may implement another frequency ripple controller along with a general switching controller.

In various embodiments, switching controller 162 provides switching signal SW causing an output switch to conduct current to charge an energy storage element, such as an inductor, increasing sensed output current CS. When output current CS reaches maximum output current Imax, comparator 168 generates switching off control signal SW_off and provides switching off control signal SW_off to switching controller 162, which changes switching signal SW causing the output switch to stop conducting current and the energy storage element begins discharging. Switching off control signal SW_off also enables off timer 164 to begin incrementing an internal count. When the internal count reaches off time Toff, off timer 164 provides switching on control signal SW_on to switching controller 162, which causes the output switch to conduct current again to charge the energy storage element again and also causes sensed output current CS to increase again.

According to various embodiments, timer 166 also monitors switching off control signal SW_off and determines switching frequency fsw by timing on time Ton and off time Toff. Switching controller 162 may generate switching signal SW based on switching on control signal SW_on and switching off control signal SW_off. Switching controller 162 may also monitor output voltage, output current, switching frequency fsw, and current ripple Iripple, and adjust maximum current Imax and off time Toff based on the measured or calculated values in accordance with control schemes described hereinabove, such as in reference to FIG. 3, for example.

According to various embodiments, switching controller 162 is an analog control circuit. In other embodiments, control circuit 152 is a digital control circuit or a microcontroller, for example. Controller 160 may be implemented as an integrated circuit (IC), as a microcontroller, as discrete components, or as some combination of such components.

The various embodiment controllers described in reference to FIGS. 4-7 are illustrative embodiment controllers and it should be understood that the various embodiments may be combined or modified by one of ordinary skill in the art, and such modifications are included in envisioned embodiments.

Figure 8:
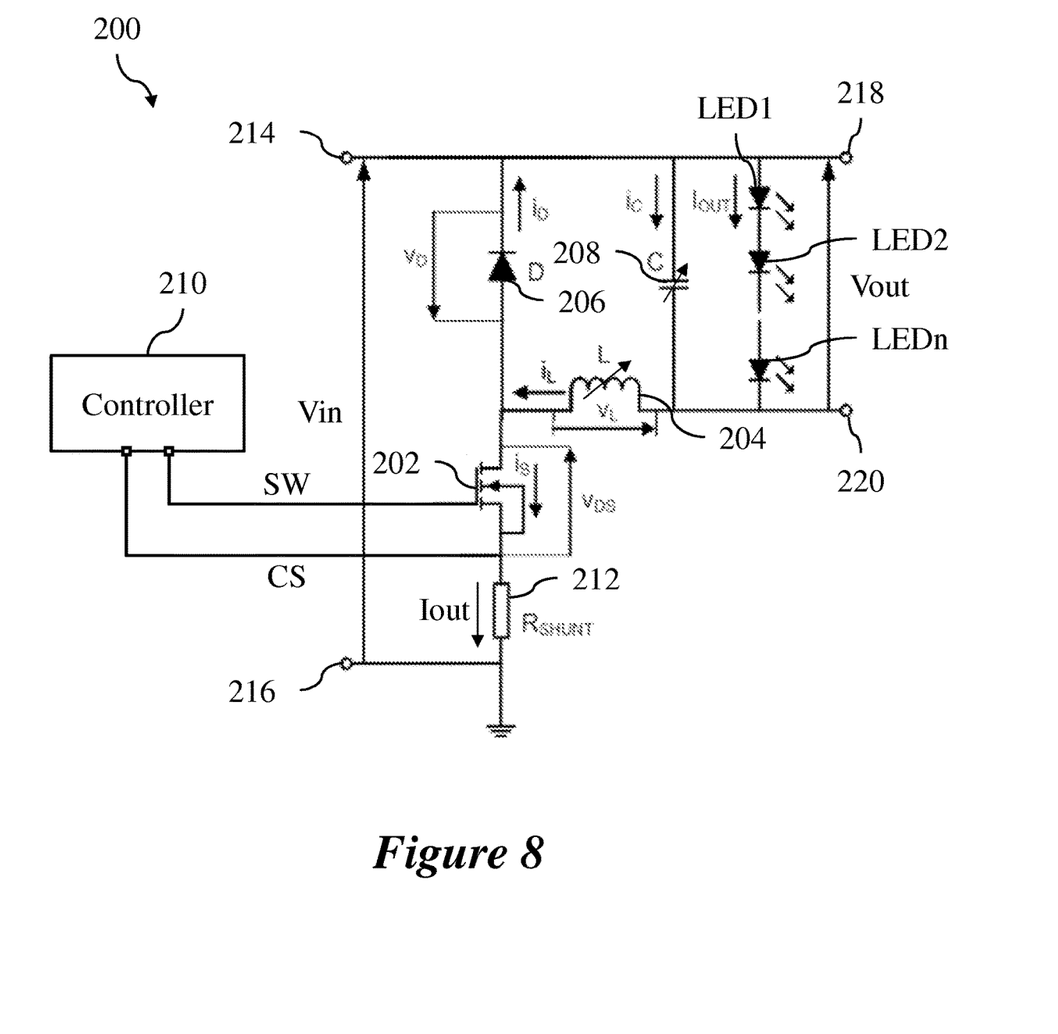
FIG. 8 illustrates a schematic of another embodiment buck converter.

FIG. 8 illustrates a schematic of another embodiment buck converter 200 including controller 210, semiconductor switch 202, inductor 204, flyback diode 206, capacitor 208, shunt resistor 212, and a series load of light emitting diodes LED1-LEDn. According to various embodiments, controller 210 supplies switching signal SW to switch 202 operable to turn on and off switch 202. When switch 202 is on, inductor current IL is conducted in series through switch 202 and shunt resistor 212 to ground. When switch 202 is off, inductor current IL is conducted through flyback diode 206 back to LEDs LED1-LEDn. In this embodiment, inductor current IL is measured with current sense node CS as the output current Iout only when switch 202 is closed. Thus, current sense node CS is used to measure and estimate output current Iout flowing through LEDs LED1-LEDn.

According to various embodiments, controller 210 may operate as described above in reference to the other figures in order to control or regulate switching frequency fsw of switch 202, current ripple Iripple through maximum and minimum current thresholds Imax and Imin, and average output current. LEDs LED1-LEDn may include any number n of LEDs. Each LED introduces a voltage drop such that a different number n of LEDs produces a different number of voltage drops leading to a different operating output voltage. Controller 210 regulates current ripple Iripple and switching frequency fsw within a specified operating range or operating area as described above, for example, in reference to FIG. 3. Specifically, controller 210 may regulate switch 202 to maintain or adjust current ripple Iripple and switching frequency fsw to be within the operating area defined by maximum ripple threshold IRmax, minimum ripple threshold IRmin, maximum frequency threshold fmax, and minimum frequency threshold fmin.

In various applications, the values of capacitor 208, inductor 204, and shunt resistor 212 may take on various values chosen by a designer. In some embodiments, inductor 204 may be a variable inductor and capacitor 208 may be a variable capacitor, as shown. In such embodiments, variable capacitor 208 and variable inductor 204 may receive control signals, such as feedback signals, regulating the inductance or capacitance based on current ripple Iripple or switching frequency fsw. Terminals 214 and 216 are coupled to a supply voltage Vin and terminals 218 and 220 provide output voltage Vout. Controller 210 may be implemented to include any of the embodiment controllers as described above in reference to FIGS. 4-7. Other types of switching converters, such as boost or buck-boost converters, may also be operated with embodiment controllers as described herein.

Figure 9:
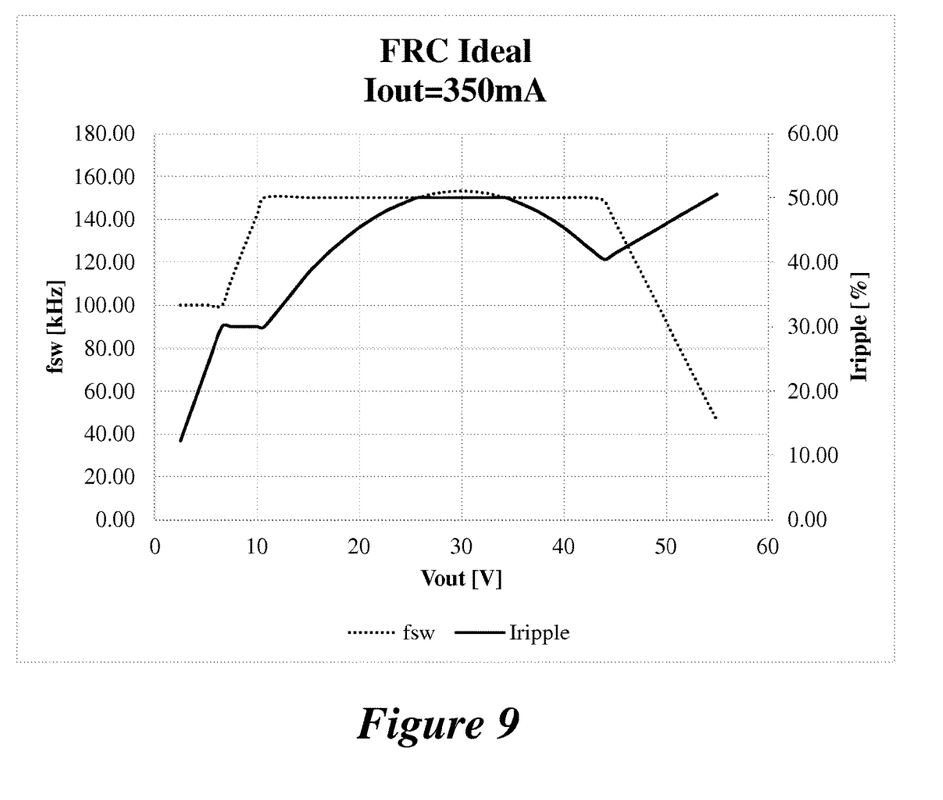
FIG. 9 illustrates a plot of control variables from an embodiment switching converter in operation.

FIG. 9 illustrates a plot of control variables from an embodiment switching converter in operation showing current ripple Iripple and switching frequency fsw for different values of output voltage Vout. According to various embodiments, as output voltage Vout increases, an embodiment controller adjusts current ripple Iripple in order to maintain switching frequency fsw below 150 kHz. When current ripple Iripple reaches 50%, the embodiment controller stops increasing current ripple Iripple and allows switching frequency fsw to increase slightly. When output voltage Vout increases past about 30 V in this example, the controller decreases current ripple Iripple in order to maintain switching frequency fsw below 150 kHz.

According to various embodiments, FIG. 9 depicts control variables for an embodiment controller that has maximum ripple threshold IRmax set as 50%, minimum ripple threshold IRmin set as 12%, maximum frequency threshold fmax set as 150 kHz, and minimum frequency threshold fmin set as 20 kHz. The inductor coupled between the switch and load may have a value of 350 mA, as shown. Numerous other plots and waveforms may be generated for different systems including different inductors or other components. Embodiment controllers described herein operate to maintain switching frequency fsw and current ripple Iripple within the specified operating area in all such different systems.

Figure 10:
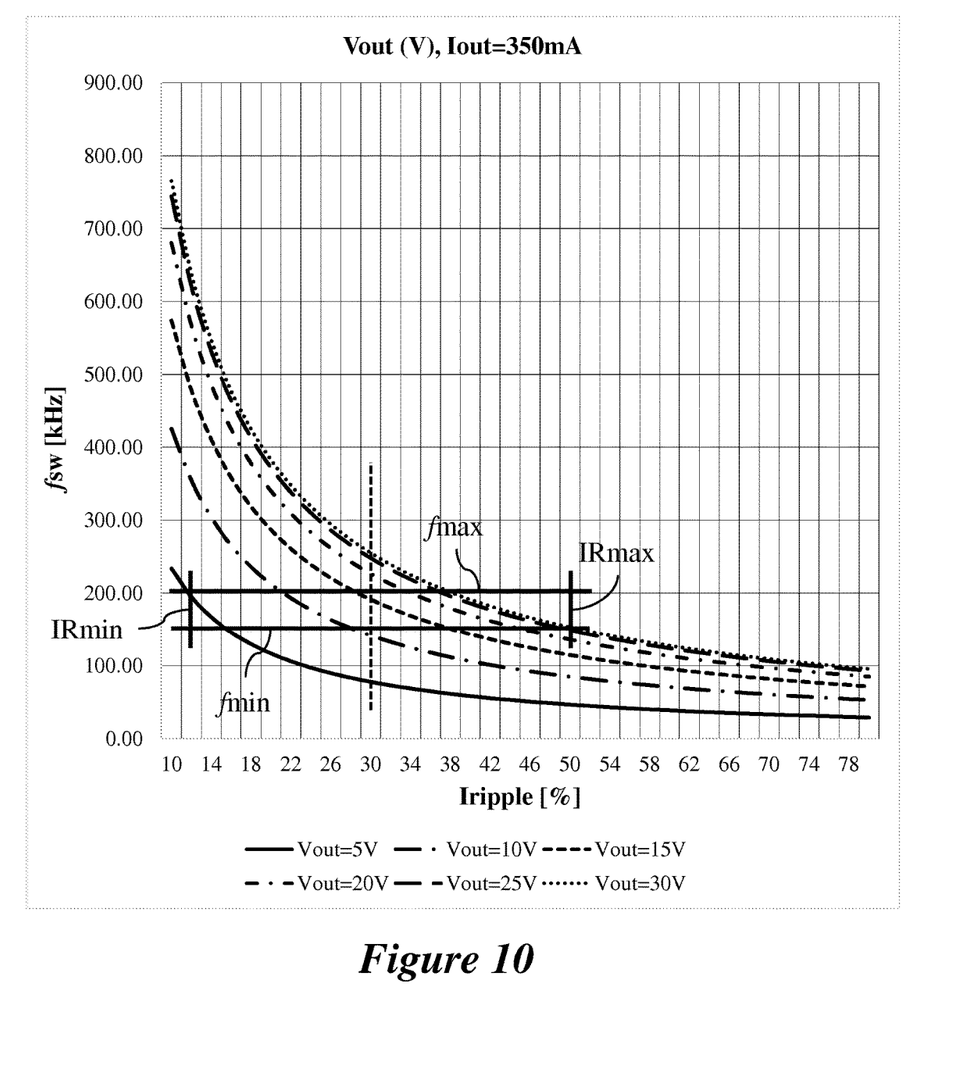
FIG. 10 illustrates a plot of further control variables from an embodiment switching converter in operation.

FIG. 10 illustrates another plot of control variables from an embodiment switching converter in operation showing curves depicting switching frequency fsw as a function of current ripple Iripple for six different values of output voltage Vout. According to various embodiments, each different value of output voltage Vout may correspond to a different load, such as a different number of LEDs, for example. Output voltage Vout is plotted for values of 5, 10, 15, 20, 25, and 30 V. In various embodiments, each plot shows an inverse relationship between switching frequency fsw and current ripple Iripple. Specifically, as current ripple Iripple increases, switching frequency fsw decreases and vice versa.

FIG. 10 also depicts an embodiment operating area specified by maximum ripple threshold IRmax set as 50%, minimum ripple threshold IRmin set as 12%, maximum frequency threshold fmax set as 200 kHz, and minimum frequency threshold fmin set as 150 kHz. In such embodiments, each curve for values of output voltage Vout corresponding to 5, 10, 15, 20, 25, and 30 V includes a portion within the specified operating area. In various embodiments, current ripple Iripple is decreased in order to increase switching frequency fsw until switching frequency fsw is above minimum frequency threshold fmin or current ripple Iripple is increased in order to decrease switching frequency fsw until switching frequency fsw is below maximum frequency threshold fmax. A starting position may be anywhere along one of the curves. In such embodiments, when a switching converter is turned on, a controller, such as a frequency ripple controller as described herein, may begin to adjust current ripple Iripple to move the operating point towards the specified operating area. In alternative embodiments, a frequency ripple controller may adjust switching frequency fsw to move the operating point towards the specified operating area.

Figure 11:
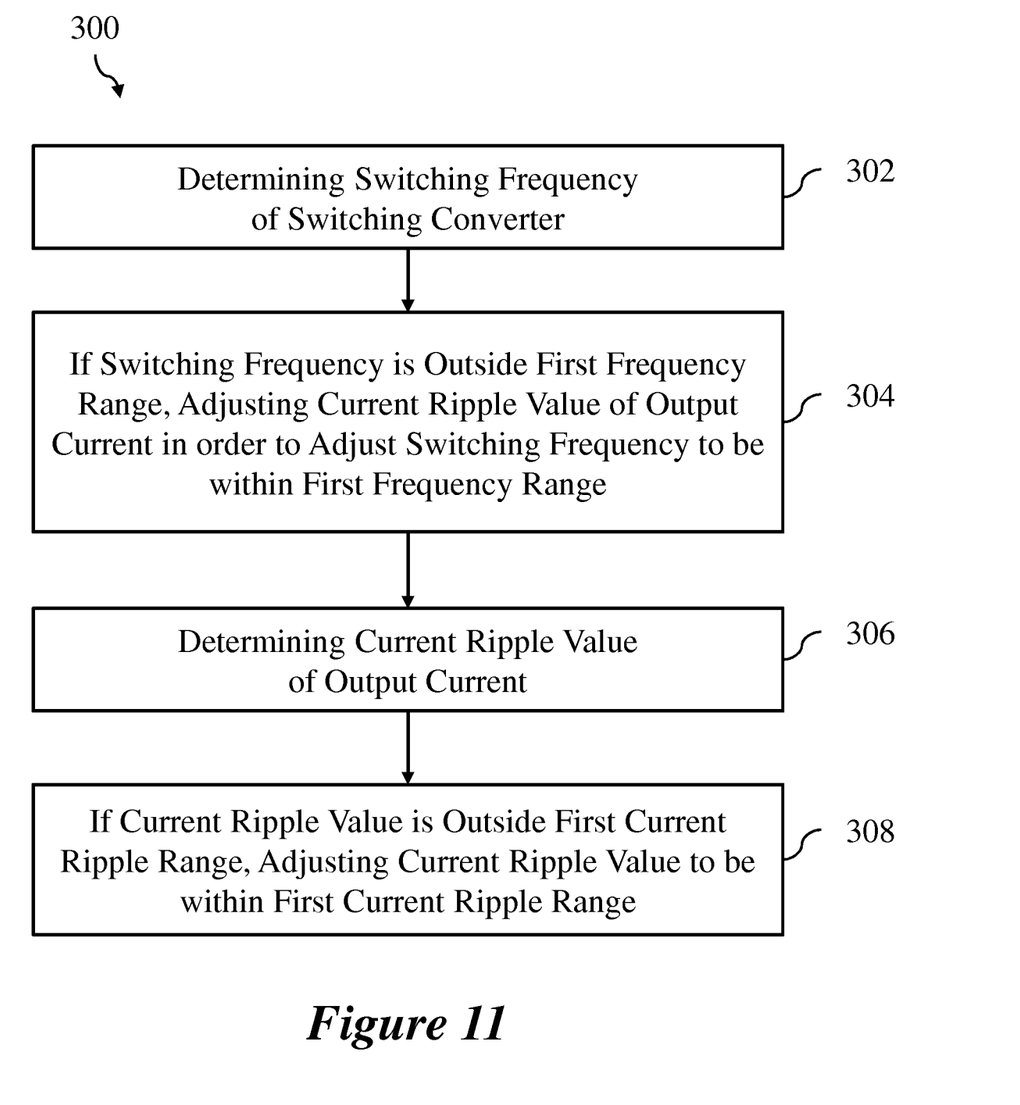
FIG. 11 illustrates a block diagram of an embodiment method of operation.

FIG. 11 illustrates a block diagram of an embodiment method of operation 300 including steps 302 and 304. Method of operation 300 may also include steps 306 and 308. According to various embodiments, method of operation 300 may be a method for operating a switching converter and step 302 includes determining a switching frequency of the switching converter. Step 304 includes adjusting a current ripple value of an output current in order to adjust the switching frequency to be within a first frequency range, if the switching frequency is outside the first frequency range. In some embodiments, method of operation 300 includes steps 306 and 308. Step 306 includes determining the current ripple value of the output current. In such embodiments, the current ripple value is a difference between a maximum value of the output current and a minimum value of the output current. Step 308 includes adjusting the current ripple value to be within a first current ripple range if the current ripple value is outside the first current ripple range. In various embodiments, method of operation 300 may include additional steps and may be rearranged according to any order of operations. Method of operation 300 may be performed in a controller, such as a frequency ripple controller, as part of a switching converter. For example, method of operation 300 may be performed on a buck converter, boost converter, or buck-boost converter in some embodiments.

Figure 12:
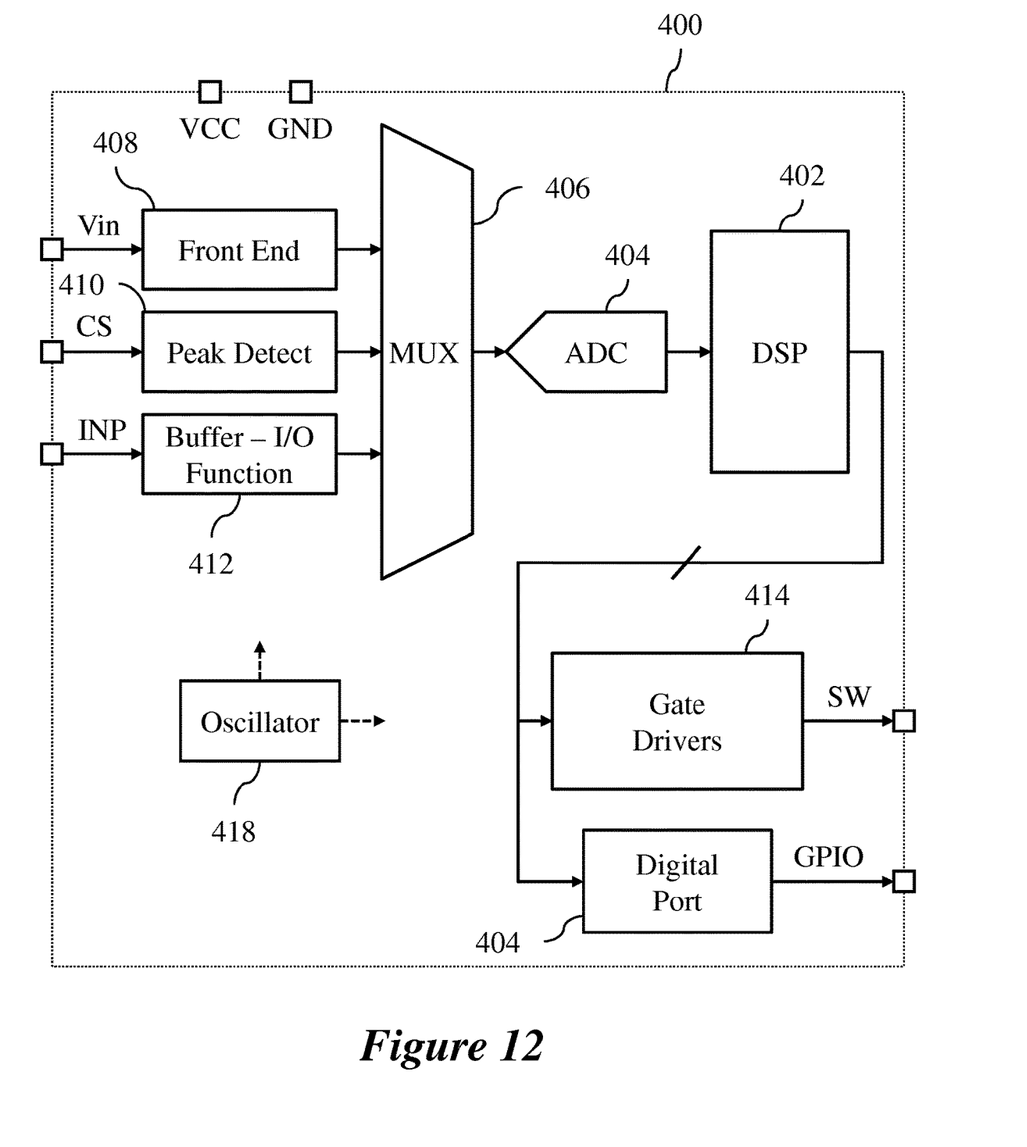
FIG. 12 illustrates a schematic of an embodiment integrated circuit.

FIG. 12 illustrates a schematic of an embodiment integrated circuit (IC) 400 including digital signal processor (DSP) 402, analog-to-digital converter (ADC) 404, multiplexer (MUX) 406, and gate drivers 414, along with other components 408, 410, 412, 416, and 418. According to various embodiments, IC 400 supplies switching signal SW to a switching converter as described herein, such as a buck converter. DSP 402 is configured to execute control functions as described herein in reference to switching controllers and frequency ripple controllers. Specifically, DSP 402 may determine switching frequency fsw, current ripple Iripple, and average output current, for example, and may control some or all of these parameters as described herein.

In various embodiments, input voltage Vin is connected through front end circuit 408, sensed output current CS, which may be a voltage signal from a shunt resistor, is connected through peak detect circuit 410, and other inputs INP may be connected to buffers or I/O functions 412. IC 400 also includes supply voltage pin VCC and ground pin GND. Other configurations of inputs and input circuits may also be included in IC 400. MUX 406 may be coupled to front end circuit 408, peak detect circuit 410, and other buffers or I/O functions 412, and may be controlled, such as by DSP 402 or another control circuit (not shown), to select the inputs. ADC 404 receives the output of MUX 406 and supplies digital signals to DSP 402. DSP 402 may perform numerous processing and control functions, including frequency ripple control, in various embodiments.

In various embodiments, gate drivers 414 receive control signals from DSP 402 and generate switching signal SW for a switch or switches in the switching converter. DSP 402 may also supply general purpose I/O pin GPIO through digital port 416. Oscillator 418 provides clock signals for all the synchronous digital components in IC 400. In various embodiments, IC 400 includes numerous other circuit blocks for numerous other functions. DSP 402 may include components or digital blocks corresponding to controllers and a frequency ripple controllers as described hereinabove in reference to FIGS. 4-7, for example.

According to various embodiments, a method for operating a switching converter includes determining an operating parameter of the switching converter and, if the operating parameter is outside a first operating range, adjusting a control parameter in order to adjust the operating parameter to be within the first operating range. The operating parameter includes at least one of a switching frequency of the switching converter and a current ripple value of an output current.

In various embodiments, the control parameter includes at least one of a variable capacitance of the switching converter, a variable inductance of the switching converter, an on time period of the switching converter, an off time period of the switching converter, a maximum output current threshold, and a minimum output current threshold. In some embodiments, the operating parameter includes the switching frequency of the switching converter, the first operating range includes a first frequency range, and adjusting the control parameter in order to adjust the operating parameter includes adjusting the current ripple value of the output current in order to adjust the switching frequency to be within the first frequency range.

In various embodiments, the method for operating a switching converter further includes determining the current ripple value of the output current. The current ripple value may include a difference between a maximum value of the output current and a minimum value of the output current. The method may also include, if the current ripple value is outside a first current ripple range, adjusting the current ripple value to be within the first current ripple range. In some embodiments, adjusting the current ripple value includes adjusting at least one of a maximum output current threshold and a minimum output current threshold. Adjusting the current ripple value may also include adjusting a switching off time. In some embodiments, the current ripple value and the switching frequency are inversely related. The method may also include operating as a buck converter to step an input voltage down to an output voltage.

According to various embodiments, a switching converter includes a controller. The controller is configured to determine a switching frequency of the switching converter and, if the switching frequency is outside a first frequency range, adjust a current ripple value of an output current in order to adjust the switching frequency to be within the first frequency range.

In various embodiments, the controller is also configured to determine the current ripple value of the output current. The current ripple value may include a difference between a maximum value of the output current and a minimum value of the output current. In some embodiments, the controller is further configured to, if the current ripple value is outside a first current ripple range, adjust the current ripple value to be within the first current ripple range. Adjusting the current ripple value may include adjusting at least one of a maximum output current threshold and a minimum output current threshold. Adjusting the current ripple value may also include adjusting a switching off time.

In various embodiments, the current ripple value and the switching frequency are inversely related. The switching converter may include a buck converter. In some embodiments, the switching converter also includes a load configured to receive the output current. In such embodiments, the load includes a light emitting diode (LED). The load may also include a plurality of LEDs.

According to various embodiments, a switching converter includes a switching unit configured to be coupled to an energy storage element, an average current controller coupled to the switching unit, and a frequency ripple controller coupled to the switching unit. The average current controller is configured to maintain an output current to the energy storage element having a substantially constant average value. The frequency ripple controller is configured to determine a switching frequency of the switching converter, determine a current ripple value of the output current from the switching converter, and adjust the current ripple value and the switching frequency if either the current ripple value is outside of a first current ripple range or the switching frequency is outside a first frequency range. The current ripple value includes a difference between a maximum value of the output current and a minimum value of the output current.

In various embodiments, the switching converter also includes the energy storage element. The energy storage element includes an inductor configured to conduct the output current to a load. The load may include a plurality of light emitting diodes (LEDs). In some embodiments, adjusting the current ripple value and the switching frequency includes adjusting at least one of a maximum output current threshold, a minimum output current threshold, an on time for the switching unit, and an off time for the switching unit.

According to various embodiments described herein, advantages may include switching converters that are flexible or adaptable to multiple load types and voltages. For a set system components, embodiment converters operating embodiment controllers may exhibit reduced losses, reduced audible noise, and reduced EMI. Further, some embodiments may reduce redesign or replacement of switching converters for multiple types of load conditions or voltages in different situations. In an embodiment, a single switching converter may be used for multiple different loads while maintaining improved performance.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a switching converter, the method comprising:
   generating an output current with a current ripple; and
   generating a switching signal, the switching signal switching between a high state and a low state with a switching frequency and a switching period, the switching period being one over the switching frequency, wherein generating the switching signal comprises
      maintaining the output current of the switching converter with a substantially constant average value during a first mode of operation;
      determining a switching frequency value of the switching signal during the first mode of operation;
      comparing the switching frequency value to a first frequency range during the first mode of operation, wherein the first frequency range comprises a lower frequency limit and a higher frequency limit, the higher frequency limit being higher than the lower frequency limit;
      if the switching frequency value is below the lower frequency limit or above the higher frequency limit, adjusting the current ripple of the output current in order to adjust the switching frequency to be above the lower frequency limit and below the higher frequency limit during the first mode of operation, wherein the current ripple is determined as a difference between a maximum current peak and a minimum current peak during a switching cycle of the switching signal, wherein the switching cycle has a duration of the switching period of the switching signal;
      determining a current ripple value of the output current during the first mode of operation as a difference between a maximum current peak and a minimum current peak during a switching cycle of the switching signal, wherein the switching cycle has a duration of the switching period of the switching signal;
      comparing the determined current ripple value of the output current to a first current ripple range during the first mode of operation, wherein the first current ripple range comprises a lower current limit and a higher current limit, the higher current limit being higher than the lower current limit; and
      if the determined current ripple value of the output current is outside the first current ripple range, adjusting the current ripple value of the output current so that the current ripple value of the output current is within the first current ripple range during the first mode of operation.

2. The method of claim 1, wherein adjusting the current ripple comprises adjusting at least one of a variable capacitance of the switching converter, a variable inductance of the switching converter, an on time period of the switching converter, an off time period of the switching converter, a maximum output current threshold, and a minimum output current threshold.

3. The method of claim 1, wherein adjusting the current ripple comprises adjusting at least one of a maximum output current threshold and a minimum output current threshold.

4. The method of claim 3, wherein adjusting the current ripple further comprises adjusting a switching off time.

5. The method of claim 1, wherein the current ripple and the switching frequency are inversely related.

6. The method of claim 1, further comprising operating as a buck converter to step an input voltage down to an output voltage.

7. The method of claim 1, wherein the adjusting the current ripple value of the output current comprises adjusting a maximum output current threshold.

8. A switching converter comprising:
   a controller configured to:
      generate an output current with a current ripple; and
      generate a switching signal, the switching signal switching between a high state and a low state with a switching frequency and a switching period, the switching period being one over the switching frequency, wherein generating the switching signal comprises:
         maintaining an output current of the switching converter having a substantially constant average value during a first mode of operation,
         determining a switching frequency value of the switching converter during the first mode of operation,
         comparing the switching frequency value to a first frequency range during the first mode of operation, wherein the first frequency range comprises a lower frequency limit and a higher frequency limit, the higher frequency limit being higher than the lower frequency limit,
         if the switching frequency value is below the lower frequency limit or above the higher frequency limit, adjusting the current ripple of the output current in order to adjust the switching frequency to be above the lower frequency limit and below the higher frequency limit during the first mode of operation, wherein the current ripple is determined as a difference between a maximum current peak and a minimum current peak during a switching cycle of the switching signal, wherein the switching cycle has a duration of the switching period of the switching signal
         determining a current ripple value of the output current during the first mode of operation as a difference between a maximum current peak and a minimum current peak during a switching cycle of the switching signal, wherein the switching cycle has a duration of the switching period of the switching signal, comparing the determined current ripple value of the output current to a first current ripple range during the first mode of operation, wherein the first current ripple range comprises a lower current limit and a higher current limit, the higher current limit being higher than the lower current limit, and if the determined current ripple value is outside the first current ripple range, adjusting the current ripple value to be within the first current ripple range during the first mode of operation.

9. The switching converter of claim 8, wherein adjusting the current ripple comprises adjusting at least one of a maximum output current threshold and a minimum output current threshold.

10. The switching converter of claim 9, wherein adjusting the current ripple further comprises adjusting a switching off time.

11. The switching converter of claim 8, wherein the current ripple and the switching frequency are inversely related.

12. The switching converter of claim 8, wherein the switching converter comprises a buck converter.

13. The switching converter of claim 8, further comprising a load configured to receive the output current, wherein the load comprises a light emitting diode (LED).

14. The switching converter of claim 13, wherein the load comprises a plurality of LEDs.

15. The switching converter of claim 8, wherein
maintaining the output current of the switching converter comprises turning on and off a switch; and
adjusting the current ripple value comprises:
opening the switch by asserting a first signal when the output current reaches a first threshold,
enabling a first timer when the output current reaches a first threshold,
closing the switch when the first timer counts to a predetermined first time.

16. The switching converter of claim 15, wherein
the determining the switching frequency comprises measuring a time with a second timer receiving the first signal, and
the controller is further configured to vary the first threshold based on switching frequency.

17. A switching converter comprising:
a switching unit configured to be coupled to an energy storage element;
an average current controller coupled to the switching unit and configured to maintain an output current to the energy storage element having a substantially constant average value; and
a frequency ripple controller coupled to the switching unit and configured to:
determine a switching frequency of the switching converter,
compare the switching frequency of the switching converter to a first frequency range, wherein the first frequency range comprises a lower frequency limit and a higher frequency limit, the higher frequency limit being higher than the lower frequency limit,
determine a current ripple value of the output current from the switching converter, wherein the current ripple value as a difference between a maximum current peak and a minimum current peak during a switching cycle of the switching converter, wherein the switching cycle has a duration of a switching period, the switching period being one over the switching frequency, and
adjust the current ripple value and the switching frequency if either the current ripple value is outside of a first current ripple range or the switching frequency is below the lower frequency limit or above the higher frequency limit.

18. The switching converter of claim 17, further comprising the energy storage element, wherein the energy storage element comprises an inductor configured to conduct the output current to a load.

19. The switching converter of claim 18, wherein the load comprises a plurality of light emitting diodes (LEDs).

20. The switching converter of claim 17, wherein adjusting the current ripple value and the switching frequency comprises adjusting at least one of a maximum output current threshold, a minimum output current threshold, an on time for the switching unit, and an off time for the switching unit.

21. The switching converter of claim 17, wherein
the average current controller is configured to maintain the output current to the energy storage element having a substantially constant average value during a primary mode of operation; and
the frequency ripple controller is configured to:
determine the switching frequency of the switching converter during the primary mode of operation,
determine the current ripple value of the output current from the switching converter during the primary mode of operation, and
adjust the current ripple value and the switching frequency if either the current ripple value is outside of the first current ripple range or the switching frequency is outside the first frequency range during the primary mode of operation.

* * * * *